United States Patent

Hiltch

(10) Patent No.: US 9,674,220 B2
(45) Date of Patent: Jun. 6, 2017

(54) SYSTEM AND METHOD THEREOF FOR OPTIMIZING DELIVERY OF CONTENT OVER A NETWORK

(71) Applicant: StreamRail Ltd., Tel Aviv (IL)

(72) Inventor: Or Hiltch, Rishon LeZion (IL)

(73) Assignee: StreamRail Ltd., Tel Aviv (IL)

( * ) Notice: Subject to any disclaimer, the term of this patent is extended or adjusted under 35 U.S.C. 154(b) by 9 days.

(21) Appl. No.: 14/796,293

(22) Filed: Jul. 10, 2015

(65) Prior Publication Data

US 2016/0014091 A1 Jan. 14, 2016

Related U.S. Application Data

(60) Provisional application No. 62/022,663, filed on Jul. 10, 2014.

(51) Int. Cl.
*H04L 29/06* (2006.01)
*H04L 29/08* (2006.01)
*H04L 12/24* (2006.01)

(52) U.S. Cl.
CPC ........ *H04L 63/1466* (2013.01); *H04L 41/083* (2013.01); *H04L 63/123* (2013.01); *H04L 65/608* (2013.01); *H04L 67/02* (2013.01); *H04L 67/104* (2013.01); *H04L 67/2814* (2013.01); *H04L 67/2819* (2013.01)

(58) Field of Classification Search
CPC . H04L 41/083; H04L 63/123; H04L 63/1466; H04L 65/608; H04L 67/2814; H04L 67/02; H04L 67/104; H04L 67/2819; H04N 21/2225; H04N 21/23103
USPC ......................................................... 726/30
See application file for complete search history.

(56) References Cited

U.S. PATENT DOCUMENTS

| 7,836,184 | B2 | 11/2010 | Luzzatti et al. | |
|---|---|---|---|---|
| 8,645,561 | B2 | 2/2014 | Luzzatti et al. | |
| 2002/0184333 | A1* | 12/2002 | Appelman | H04L 29/06 709/217 |
| 2003/0187917 | A1* | 10/2003 | Cohen | H04L 67/1095 709/203 |
| 2012/0124372 | A1* | 5/2012 | Dilley | H04L 67/2819 713/162 |
| 2013/0013726 | A1* | 1/2013 | Westberg | H04L 67/2847 709/213 |
| 2014/0201308 | A1* | 7/2014 | Rhea | H04L 12/6418 709/213 |
| 2015/0180748 | A1* | 6/2015 | Ding | H04L 41/046 709/224 |

FOREIGN PATENT DOCUMENTS

| WO | 2007110865 B1 | 11/2007 |
|---|---|---|
| WO | 2008038280 A2 | 4/2008 |

* cited by examiner

*Primary Examiner* — Yogesh Paliwal
(74) *Attorney, Agent, or Firm* — M&B IP Analysts, LLC

(57) ABSTRACT

A method and system for optimizing the delivery of content items over a network are provided. The method includes intercepting a request sent from a first node to retrieve a content item from a web source, the request includes information related the web source; extracting from the request a pointer to the web source and requested content item; identifying using the pointer at least one additional node that has previously requested the content item from the web source; selecting one of the at least one additional node as a second node for providing the content item to the first node; fetching the content item from the second node; and enabling a display of the content item on the first node.

19 Claims, 6 Drawing Sheets

SYSTEM AND METHOD THEREOF FOR OPTIMIZING DELIVERY OF CONTENT OVER A NETWORK

CROSS-REFERENCE TO RELATED APPLICATIONS

This application claims the benefit of U.S. Provisional Application No. 62/022,663 filed on Jul. 10, 2014, the contents of which are hereby incorporated by reference.

TECHNICAL FIELD

The disclosed embodiments generally relate to systems for providing content over a network, and more particularly to systems and methods for intercepting requests for content received from a node and providing the content in an optimized manner.

BACKGROUND

The traffic over the world-wide-web (WWW) using the Internet is growing rapidly, as well as the complexity and size of the information moved from sources of information to users of such information. Bottlenecks in the movement of data from the content suppliers to the users delay the passing of information and decrease the quality of the user's experience. Traffic is expected to increase faster than the ability to resolve data transfers over the Internet.

Video streaming is a particularly large movement of data. In a traditional model, when viewing videos around the web, video content is typically streamed from a content delivery network (CDN) to a user. When streaming video on the web, two key indicators are utilized to measure the performance: video start playing time and streaming without interruption (which is impacted by the download speed of the user and upload speed of the CDN). The start playing time is the time video after the video player gets the signal to begin playing).

Current solutions attempt to accelerate webpage content delivery from a supplier of the content to the users. For example, to improve performance of video start playing time, it is possible to preload the video content. However, there are two disadvantages with preloading the content: the video must be present on the webpage to be preloaded. Simply preloading the video to a user device may be an optimal approach, as the user may not view the preloaded video at all.

Transferring data is also susceptible to malicious activity. For example, in a peer-to-peer CDN, a malicious peer can potentially transmit fake content by means of overriding the URL (for example, by changing the OS host's file). This may lead to an incorrect or malicious content with a supposedly correct URL. This can lead to the spread of malicious content between peers.

To tamper with the resource, a malicious node could override the content item behind the URL of the resource being shared from the malicious node. For example, if a browser operated by the client node may browse to website (to www.website1.com) that uses a peer-to-peer Web Real-Time Communication (WebRTC) CDN with a drop-in script. One of the website's component may include an image at www.site1.com/images/logo.png. This allows the attacker to edit the OS host's file to set 127.0.0.1 (or any other IP) as the IP for the DNS www.site1.com, which will lead to the client (the browser in this case) trying to get the resource from an incorrect address. As a result, the peer-to-peer WebRTC CDN would share the incorrect resource with other nodes. This will lead to distribution of malicious content in the network 120.

Another way of abusing the peer-to-peer WebRTC CDN to distribute incorrect content between nodes is by changing the data on the client, regardless of the URL. For example, node A can get data for a content item from node B, and malicious node B might change this data. Then, node B sends out incorrect data for the same content item to other nodes upon request to get data for this content item. For example, if the content item data is a DataURI representation of an image, node B might change that image by manipulating the DataURI, and sometime after that, when node C requests that image data and node B is chosen to provide the image data, the bad data will be distributed from node B to node C, and so on.

It would therefore be advantageous to overcome these limitations of delivering multimedia content over the web.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The embodiments disclosed herein include a method for optimizing the delivery of content items over a network. The method comprises: intercepting a request sent from a first node to retrieve a content item from a web source, the request includes information related the web source; extracting from the request a pointer to the web source and requested content item; identifying using the pointer at least one additional node that has previously requested the content item from the web source; selecting one of the at least one additional node as a second node for providing the content item to the first node; fetching the content item from the second node; and enabling a display of the content item on the first node.

The embodiments disclosed herein further include a system for optimizing the delivery of content items over a network. The system comprises: a processing unit; and a memory, the memory containing instructions that, when executed by the processing unit, configure the system to: intercept a request sent to retrieve a content item from a web source, the request includes information related to the web source; extract from the request a pointer to the web source and requested content item; identify using the pointer at least one additional node that has previously requested the content item from the web source; select one of the at least one additional node as a second node for providing the content item to the system; fetch the content item from the second node; and enable a display of the content item.

BRIEF DESCRIPTION OF THE DRAWINGS

The subject matter that is regarded as the disclosed embodiments is particularly pointed out and distinctly claimed in the claims at the conclusion of the specification.

The foregoing and other objects, features, and advantages of the disclosed embodiments will be apparent from the following detailed description taken in conjunction with the accompanying drawings.

DETAILED DESCRIPTION

Figure 1:
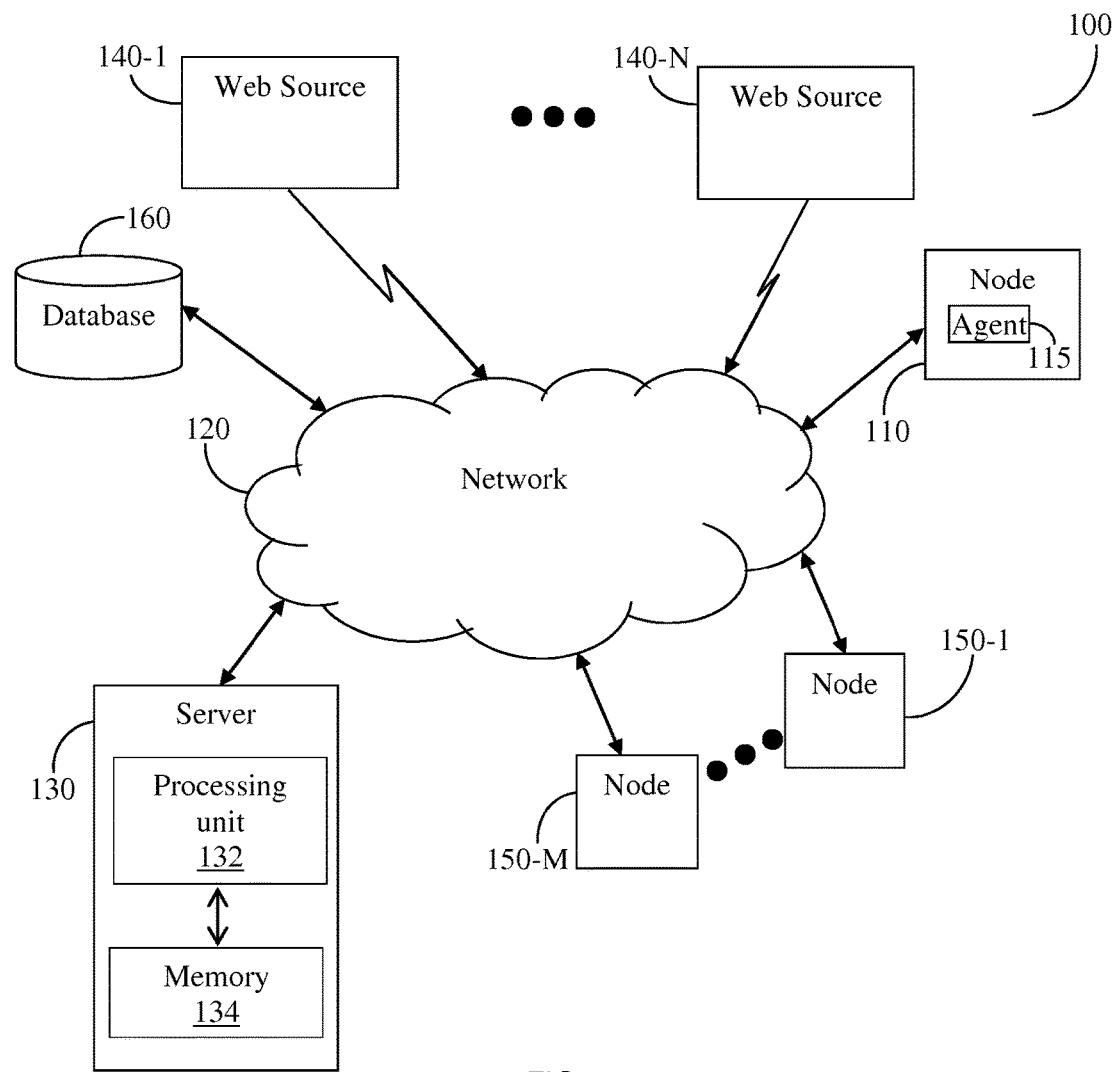
FIG. 1 is a schematic block diagram of the system utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 depicts an exemplary and non-limiting block diagram of a system 100 utilized to describe the various disclosed embodiments. A first node 110 is communicatively connected to a network 120. The first node 110 may be a computing device, such as a personal computer (PC), a laptop computer, a personal digital assistant (PDA), a mobile phone, a smart phone, a tablet computer, and the like. The network 120 may be wireless, cellular or wired, a local area network (LAN), a wide area network (WAN), a metro area network (MAN), the Internet, the worldwide web (WWW), like networks, and any combination thereof.

The first node 110 includes an agent 115 installed and/or executed by the node 110. The agent 115 may be a software code that is installed in a memory (not shown) of the first node 110 and executed by a processing element (not shown) of such first node 110. In an alternative embodiment, the agent 115 may be a script, that is supported natively by a browser of the first node 110 may be used.

The agent 115 is used to intercept requests for content items sent from the first node 110 as well as scanning and analyzing resources over the network 120. Optionally, the agent 115 may be communicatively connected to a server 130 over the network 120. The server 130 configures the agent 115 over the network 120 to optimize the delivery of content items to the first node 110 over the network 120 as further described herein below.

In certain configurations, the server 130 typically comprises a processing unit 132 and a memory 134. The processing unit 132 may include one or more processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit 132 may be coupled to the memory 134. In an embodiment, the memory 134 contains instructions that when executed by the processing unit results in the performance of the methods and processes described herein below. Specifically, the memory 134 may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing unit 132 to perform the various functions described herein.

It should be noted that each of nodes 110 and 150 may include a processing unit and a memory have the structure and functionality such as those described above. That is, each node 110 and/or node 150 may be configured to execute an agent performing the disclosed embodiments.

According to an embodiment, the agent 115 is configured to intercept a request sent by the first node 110 for a content item from a web source of one or more web sources 140-1 through 140-N (collectively referred hereinafter as web sources 140 or individually as a web source 140, merely for simplicity purposes), where N is an integer equal to or greater than 1, over the network 120. The web sources 140 may be, for example, webpages, remote servers, data centers, content delivery networks (CDNs), and the like. The request contains information at least respective of the web source 140. The agent 115 is further configured to extract from the information a pointer to the web source 140. The pointer may include a URL, a URI, a content item ID, a protocol type, a player type, any combination thereof, and the like.

The agent 115 then analyzes the web source 140 respective of the pointer to identify one or more nodes of a plurality of nodes 150-1 through 150-M, where M is an integer equal to or greater than 1, communicatively connected to the network 120 that have previously requested the content item from the web source 140. The analysis may include, for example, a scan of the body tags of a webpage.

In an embodiment, the identification of the plurality of nodes 150 may be achieved by mapping the communication pattern of the web source 140 and/or its respective shareable portions and their corresponding identifiers (for example, unified resource locators), etc. The agent 115 then selects at least a second node of the plurality of nodes 150, for example the second node 150-1, for providing the content item to the first node 110.

Upon selecting a second node, the agent 115 is further configured to fetch the requested content item from the second node 150-1. According to one embodiment, the content item can be fetched using a web real-time communication (webRTC) application programming interface (API).

In a non-limiting and exemplary embodiment, data respective of the web sources 140, the plurality of nodes 150, and the requests sent by the first node 110 may be stored in a database 160 communicatively connected to the first node 110 over the network 120.

It should be appreciated that the operation described herein above with respect to the agent 115 may be executed by the server 130 without departing from the scope of the disclosed embodiments.

According to a further embodiment, in order to prevent data manipulation by the plurality of nodes 150, the agent 115 is configured to generate one or more signatures to the content item available through the selected second node(s) 150 using, for example, a hash function. The generation of signatures is performed after identification of the content item availability in the second node 150.

Then, prior to fetching the content item from the second node 150, the agent 115 is configured to compute the hash value of the content item and compares the computed hash value to the generated signature(s). In an embodiment, the generation of signatures and comparison are performed respective of a portion of the content item.

In an alternative embodiment, in order to validate the content item available in the second node 150, the agent 115 is configured to fetch the content item from the second node, and send the content item to the server 130 for further analysis and authentication. Then, after the authentication, the agent 115 is further configured to enable the display of the content item on the first node 110.

In an embodiment, when a web source 140 (for example, a webpage) is equipped with a peer-to-peer webRTC CDN component, that component may attempt to share the resources held by the web source 140 with nodes on the network 120 by identifying that resources on the client are sharable, for example, an image URL that is requested by other nodes.

Figure 4:
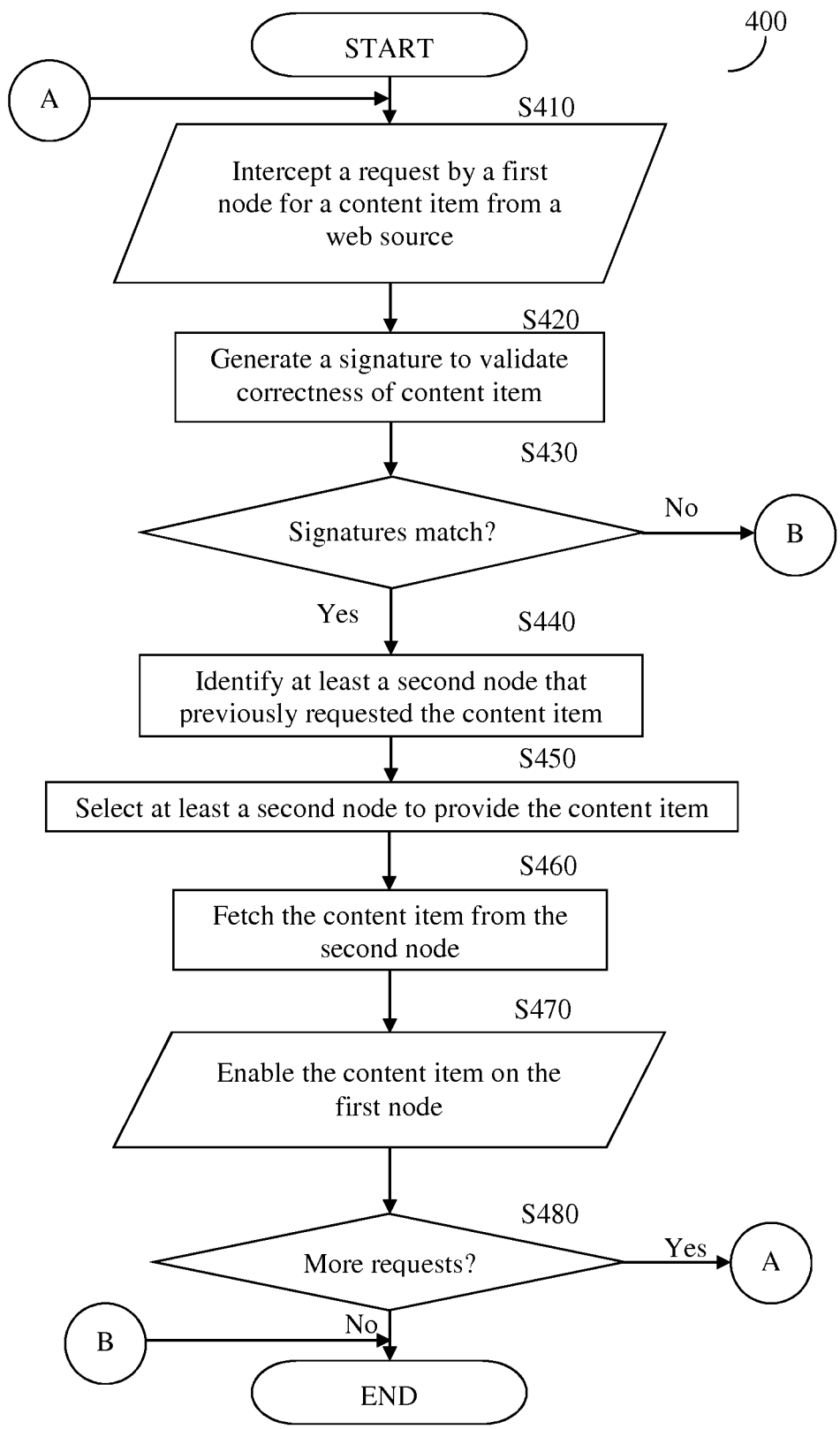
FIG. 4 is a flowchart describing a method for protecting the delivery of content item over a network against malicious data manipulation activity in accordance with one embodiment.
Figure 5:
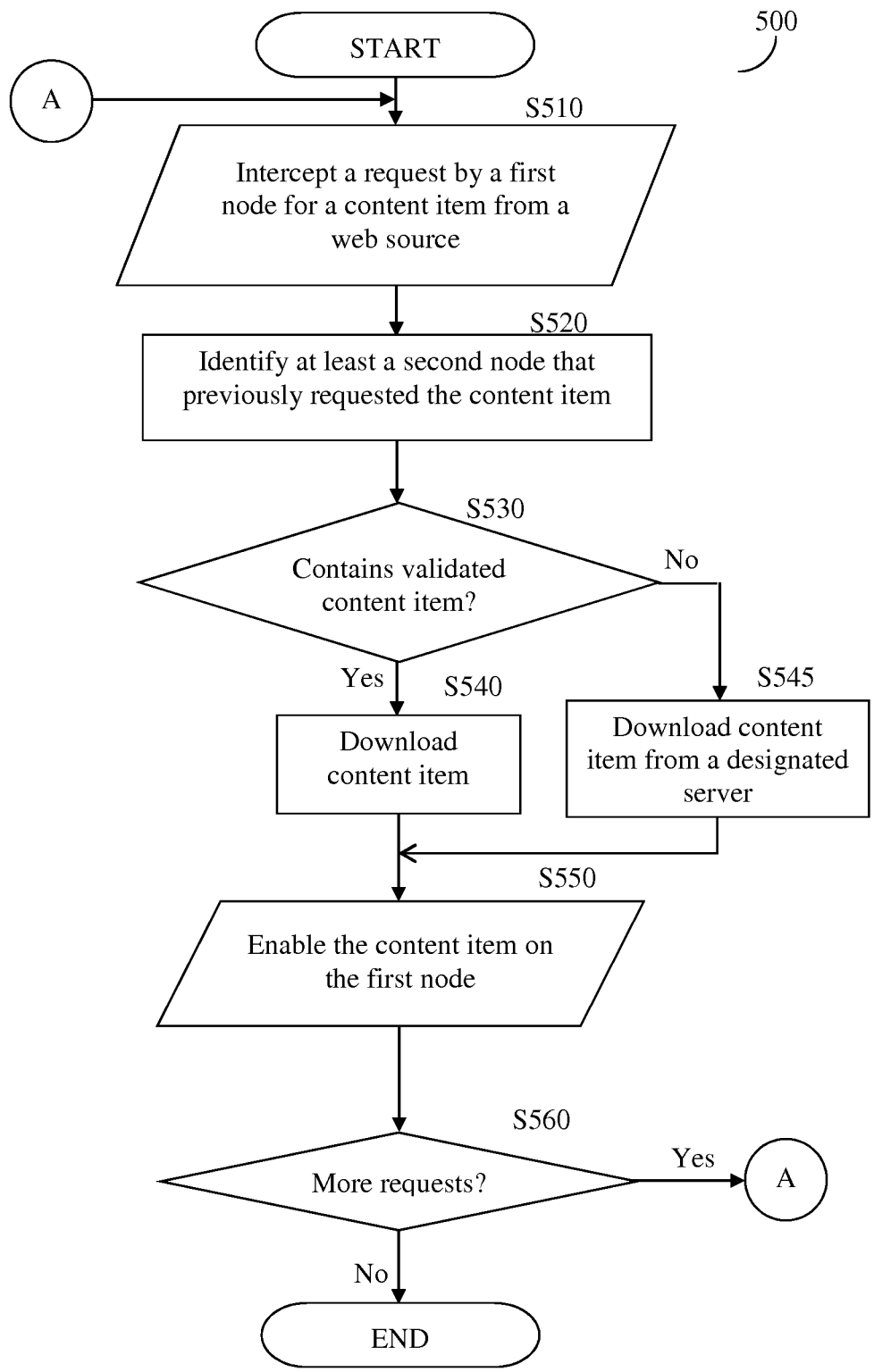
FIG. 5 is a flowchart describing a method for protecting the delivery of content items over a network against malicious URL overriding activity in accordance with one embodiment.

According to some embodiments, the malicious activities discussed earlier (i.e., URL overriding and data manipulation) can be mitigated using the methods discussed with respect to FIGS. 4 and 5. Each method provides an independent solution for a different level of protection.

On a webRTC peer-to-peer CDN, a content deliverer is a node in a network 120 that sends, caches, and receives content items between nodes. In this type of CDN, a content item required by a website visited by one node is shared between that node and other nodes as long as those nodes require the same content item and are able to send or receive that content item.

On a traditional, non-peer-to-peer, CDN the content items are fetched from a remote server (or a network of proxy servers which cache and serve content) when a browser downloads the content item from a URL specified as an attribute of the resource (for example, image or video source). In peer-to-peer CDNs, since it is desirable to transfer the content item between nodes when possible without downloading the content item from a remote server, the URL may not be used simply as a download-from address for the purpose of content delivery.

Instead, the URL may be used as an identifier of the content item (or part of the identifier), and the server 130 can then manage the sharing of content items, using resource URLs as identifiers. Thus, when a webRTC component analyzes a webpage on a node, such a component needs to identify the sharable content items on the webpage by scanning the webpage to produce a mapping of shareable content items on the webpage and their corresponding identifiers (which may be URLs).

According to the disclosed embodiments, this process may be optimized by identifying content items that can be shared among nodes based on the content items' URLs, their contents, and computing the content-correlation between content items received from different URLs as a means of determining an optimized sharing scheme. This optimized scheme allows a webRTC peer-to-peer CDN to share more data across the peer-to-peer network which otherwise could not be shared between nodes.

As an exemplary and non-limiting embodiment, in case a request to a web source 140-1 for a video content item is received from a node, for example the second node 150-1, at least a portion of the video item (e.g., the first bytes of a video file) is preloaded in a memory of the respective node. Upon receiving a request for the video item from the first node 110 to the web source 140-1, the at least a portion of the video item is streamed to the first node 110 through a webRTC API, thereby enhancing the experience of a user of the first node 110 by shortening the initialization time of the display of the video item. Efficient preloading of video content is explained in further detail herein below with regard to FIG. 6.

Figure 2:
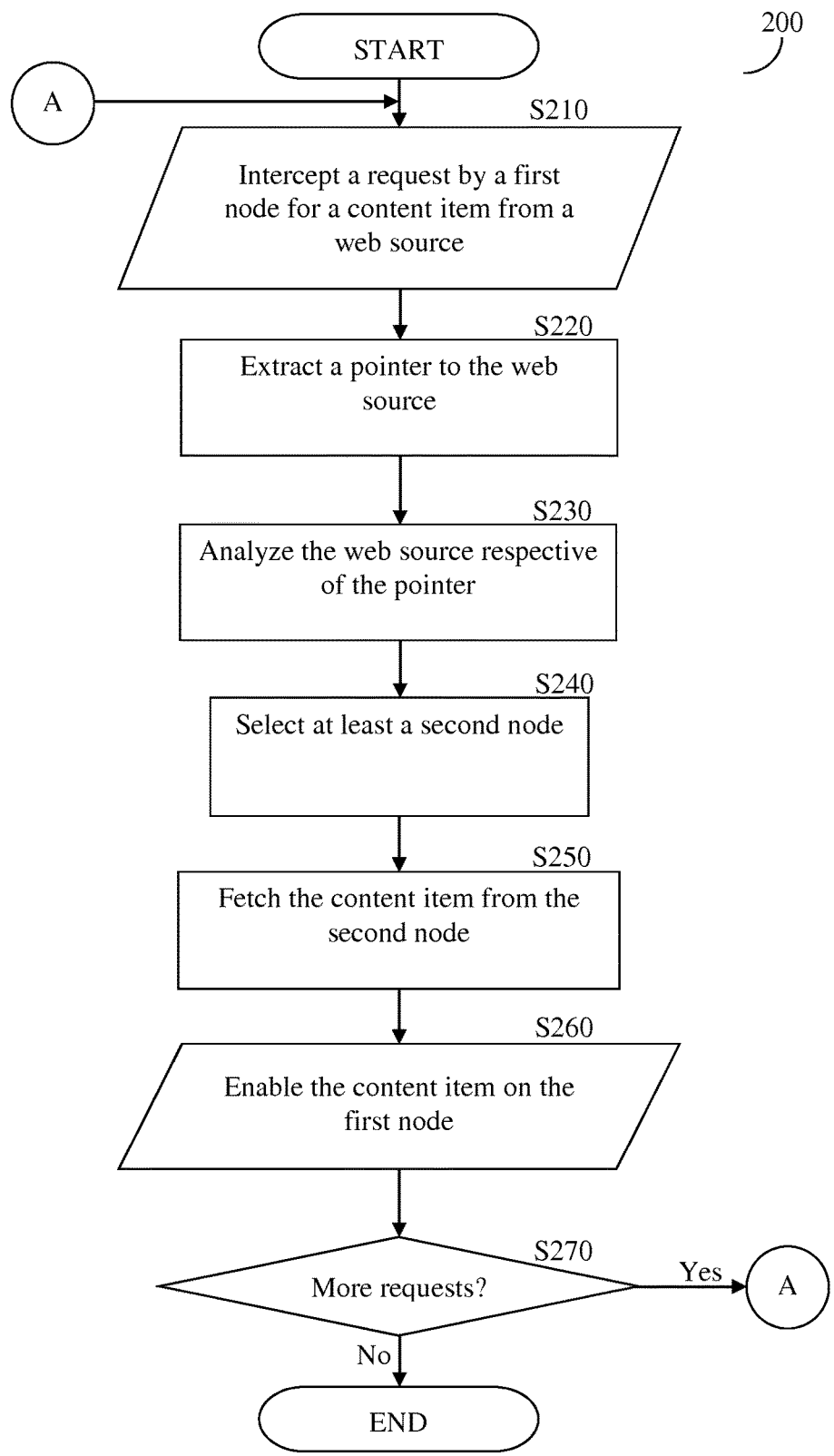
FIG. 2 is a flowchart describing a method for optimizing delivery of content items over a network in accordance with one embodiment.

FIG. 2 depicts an exemplary and non-limiting flowchart 200 describing a method for optimizing delivery of content items over a network in accordance with an embodiment. In S210, a request sent by a first node 110 for a content item from a web source is intercepted. In an embodiment, the request contains information related to the web source. In S220, at least a pointer to the web source and/or the content item designated in the request is extracted. The pointer may include a URL, a URI, a content item ID, any combination thereof, and the like. In S230, the web source is analyzed respective of the pointer to identify a plurality of nodes 150 that have previously requested the content item from the web source.

In S240, at least a second node, for example node 150-1 is selected for providing the content item to the first node 110. The selection may be based on current availability of the identified nodes, their locations with respect to the first node, their bandwidth, and so on.

In S250, the content item is downloaded or fetched from the selected node 150-1. In S260, the fetched content item is enabled for display or rendering on the first node. In S270, it is checked whether there are additional intercepted requests and if so, execution continues with S210; otherwise, execution terminates.

According to certain embodiments, the process described with reference to FIG. 2 may be performed by an agent executed over a node 110 (e.g., an agent 115) or by a server (e.g., the server 130) communicatively connected to the network 120, and the nodes 110 and 150.

Figure 3:
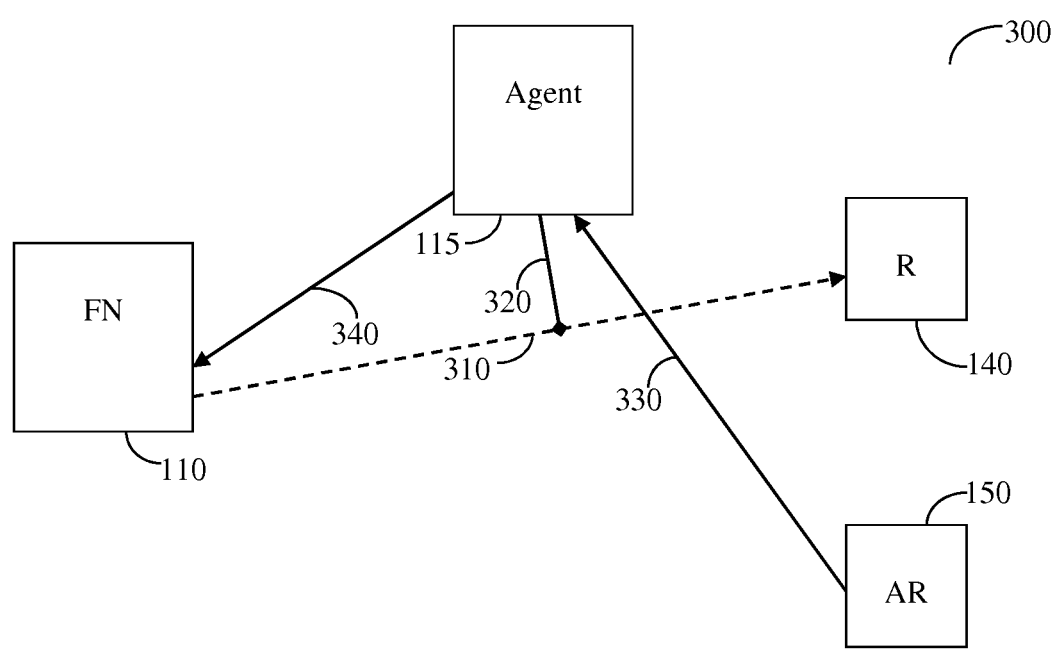
FIG. 3 is a schematic communication diagram describing the optimization of content items delivery in accordance with one embodiment.

FIG. 3 depicts an exemplary and non-limiting schematic communication diagram 300 describing a process for optimizing delivery of content over the web in accordance with an embodiment. The communication starts when a request for a content item 310 from a resource 140 is sent from by a first node 110. The request is intercepted 320 by the agent 115. After analysis of the resource 150 and identification of at least a second node 150 for delivery of the content, the agent 115 fetches the content item 330 from the second node 150. The agent 115 than enables 340 the content item on the first node 110.

FIG. 4 depicts an exemplary and non-limiting flowchart 400 describing a method for protecting the delivery of content item over a network against malicious data manipulation activity in accordance with an embodiment. In S410, a request sent by a first node 110 for a content item from a web source is intercepted. In S420, in order to decide if the content item is sharable, a signature is generated for the content item. The signature is utilized to validate the correctness of the content item on the web source 140 when the content item is first requested by the first node 110. In an exemplary and non-limiting embodiment, the signature is generated with a hash function over the content item. Examples for such hash functions include CRC32, MD5, and the like.

In S430, the signature of the content item is compared to an original signature received from a server (e.g., the server 130). If the signatures match, then execution continues with S440; otherwise execution terminates. That is, if the signatures do not match, then the content item is not fetched from the second node or the content item is disabled on the first node.

In an embodiment, the server 130 only downloads signatures on behalf of nodes when requested content items are not cached. For example, a node queries the server to receive the data representation of an image based on the images' URL. In response, the server is configured to download the image, cache the downloaded image, and return the downloaded image. The image can be sent as a stream of bytes or as a DataURI representation.

In S440, at least one node (of the nodes 150, see FIG. 1) previously requested the content item from the web source is identified. If more than one node 150 is identified, in S450, a second node, for example node 150-1 is selected for providing the content item to the first node 110. In S460, the content item is fetched from the selected node. In S470, the fetched content item is enabled for displayed or rendering on the first node 110. In S480, it is checked whether there are additional requests, and if so, execution continues with S410; otherwise, execution terminates.

FIG. 5 depicts an exemplary and non-limiting flowchart 500 describing a method for protecting the delivery of content items over a network against malicious URL overriding activity in accordance with an embodiment.

In S510, a request sent by a first node 110 for a content item from a web source is intercepted. In S520, at least one node (such as nodes 150, FIG. 1) that has previously requested the content item from the web source is identified. In S530, it is checked whether the identified nodes 150 contain a validated content item, and if so execution continues with S540; otherwise execution continues with S545. In an embodiment, a content item is validated if it is determined to originate from a trusted server.

In S540, the content item is downloaded (or fetched) from a second node 150 that already has the validated-content item. The second node is selected from the identified nodes determined to hold a validated content item.

In S545, the content item is downloaded (or fetched) from a designated (trusted) server (e.g., the server 130). This creates a contained environment in which the original source of the content item can only be the trusted server, and that content item can be freely distributed between nodes as it is guaranteed to be protected from URL overriding.

In S550, the downloaded (or fetched) content item is enabled for display on the first node 110. In S560, it is checked whether there are additional requests and if so, execution continues with S510; otherwise, execution terminates.

Figure 6:
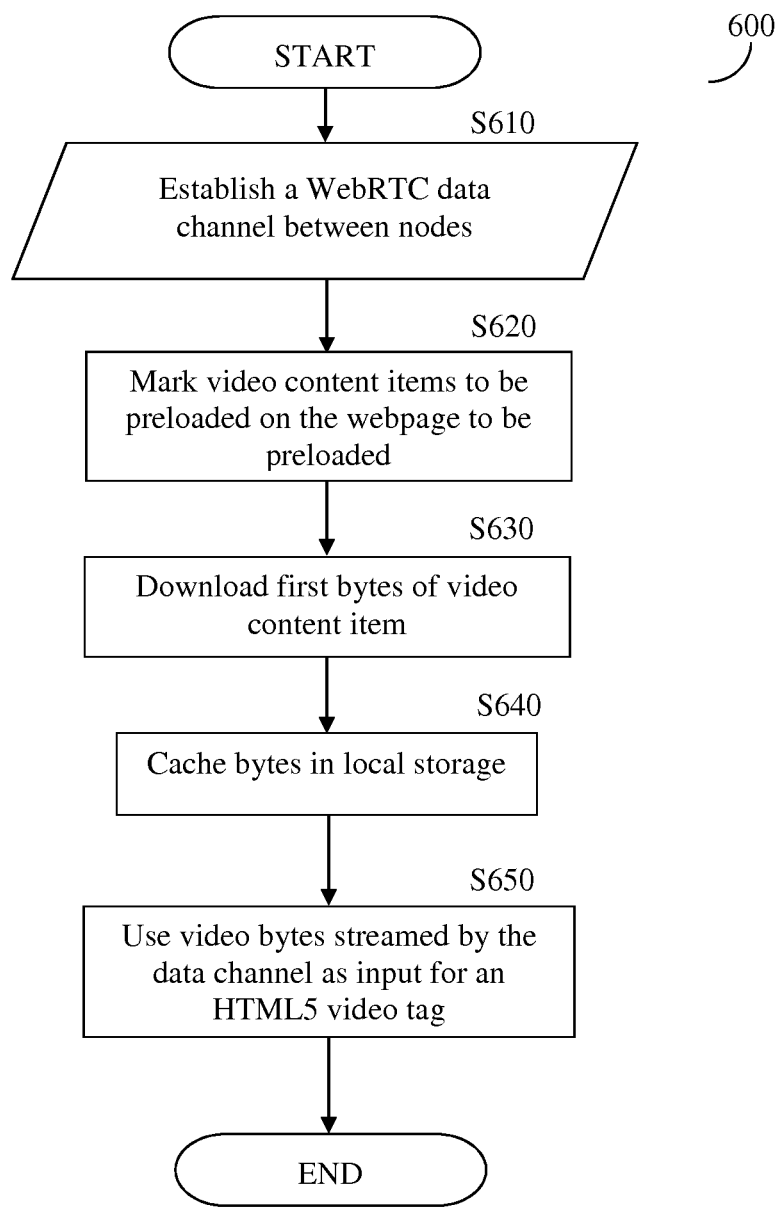
FIG. 6 is a flowchart describing a method for efficient preloading of video content in accordance with an embodiment.

FIG. 6 depicts an exemplary and non-limiting flowchart 600 describing a method for efficient preloading of video content in accordance with an embodiment. In S610, a data channel is established between nodes, for example, by forming a mesh (or any other kind of connected graph) that allows the nodes to transmit data to each other. In an embodiment, the data channel is a WebRTC channel.

In S620, on the webpage to be preloaded, the video content items to be preloaded are tagged. The tagging can be performed using a HTML tag or JavaScript. As an example, video tags are placed with data-src attributes that identify this content item in the network.

In S630, the first bytes of the video content item are downloaded by at least one node on the formed data channel. In an embodiment, the video bytes are downloaded using, for example, XmlHttpRequest (XHR). In a further embodiment, only video bytes from a predefined time length from the beginning of the video content (e.g., the first 5 seconds) are downloaded. The download can be achieved by requesting an array buffer as the response for the XHR. XMLHttpRequest (XHR) is an API available to web browser scripting languages such as JavaScript. The XHR is utilized to deliver HTTP or HTTPS requests to a web server and load the server response data back into the script.

In S640, the bytes are cached by the node. In an embodiment, the bytes are cached by saving the bytes to local storage of the node. In a further embodiment, the bytes are read as base64 strings that are valid for saving on local storage using, for example, HTML5 API.

In an alternate embodiment, the bytes are sliced into chunks. The sliced bytes are spread across the data channel to other nodes. The sliced bytes are stored by the local nodes in their respective local storage.

In S650, the video bytes streamed via the data channel are used by the nodes to render the video content on a display. In an exemplary and non-limiting embodiment, the video rendering is performed using an HTML5 video tag or a MediaSource Extensions API by appending the bytes to a media source buffer.

It should be appreciated that the method discussed with reference to FIG. 6, allows for preloading of video content (clip), even if such content is not immediately available on the webpage. This is achieved because the bytes representing the first seconds of the video are saved in each node's local storage. As a result, bytes of the video content can be quickly loaded from a local storage and input to the appropriate video tag for rendering. That is, the first portion of the video content is not retrieved from the CDN or another node having the content.

It should be further appreciated that chunking the video content allows multiple parts (portions) of the content to be sent in parallel, thereby maximizing the download capacity of the receiving node while keeping the seeding nodes uncongested. For example, a node P1 has a maximum download ability of 1 Mbps. Using a peer-to-peer CDN guarantees that the 1 Mpbs is used by splitting the content item into 1000 chunks of 1 KB, and having nodes P2, P3, . . . , P101 send the data chunks in parallel. As a result, each of the nodes P2, . . . , P101 uploads 1 KB with 100% utilization of each node's upload capability.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for optimizing the delivery of content items over a network, comprising:
   intercepting a request sent from a first node to retrieve a content item from a web source, the request includes information related the web source;
   extracting from the request a pointer to the web source and requested content item;
   identifying using the pointer at least one additional node that has previously requested the content item from the web source;
   selecting one of the at least one additional node as a second node for providing the content item to the first node;
   fetching the content item from the second node;
   enabling a display of the content item on the first node;
   generating at least one signature for the content item fetched from the second node;
   comparing the generated signature to an original signature received from an external source; and
   terminating the fetching the content item from the second node, thereby the generated signature allows validating correctness of the content item on the web source.

2. The method of claim 1, wherein the first node, the second node, and the web source are communicatively connected to the network.

3. The method of claim 1, wherein the fetching is performed using at least a web real-time communication (we-bRTC) application programming interface (API).

4. The method of claim 1, wherein the signature is generated using a hash function computed over the content item or a portion of the content item.

5. The method of claim 1, further comprising:
   protecting the delivery of the content item over the network against malicious URL overriding activity.

6. The method of claim 5, further comprising:
   determining if the second node maintains a validated copy of the content item, wherein the validated copy is originated from a trusted server;
   fetching the content item from the second node, if the second node maintains a validated copy; and
   fetching the content item from a trusted server, if the second node does not maintain a validated copy.

7. The method of claim 1, wherein the selection of the second node is based on at least one of: current availability of the at least one additional node, locations the at least one additional node with respect to the first node, and available bandwidth of the at least one additional node.

8. The method of claim 1, further comprising:
   fetching a first portion from the second node; and
   preloading the first portion to a local storage of the first node, wherein the first portion is a predefined length of content from the beginning of the content item.

9. The method of claim 1, wherein the web source is at least any one of: a content delivery network (CDN) and a peer-to-peer Web Real-Time Communication (WebRTC) CDN.

10. A non-transitory computer readable medium containing instructions that when executed on a computing device performs a method for optimizing the delivery of content items over a network, comprising:
    intercepting a request sent from a first node to retrieve a content item from a web source, the request includes information related the web source;
    extracting from the request a pointer to the web source and requested content item;
    identifying using the pointer at least one additional node that has previously requested the content item from the web source;
    selecting one of the at least one additional node as a second node for providing the content item to the first node;
    fetching the content item from the second node;
    enabling a display of the content item on the first node;
    generating at least one signature for the content item fetched from the second node;
    comparing the generated signature to an original signature received from an external source; and
    terminating the fetching the content item from the second node, thereby the generated signature allows validating correctness of the content item on the web source.

11. A system for optimizing the delivery of content items over a network, comprising:
    a processing unit; and
    a memory, the memory containing instructions that, when executed by the processing unit, configure the system to:
    intercept a request sent to retrieve a content item from a web source, the request includes information related the web source;

extract from the request a pointer to the web source and requested content item;

identify using the pointer at least one additional node that has previously requested the content item from the web source;

select one of the at least one additional node as a second node for providing the content item to the system;

fetch the content item from the second node;

enable a display of the content item;

generate at least one signature for the content item fetched from the second node;

compare the generated signature to an original signature received from an external source; and terminate the fetching the content item from the second node, thereby the generated signature allows validating correctness of the content item on the web source.

12. The system of claim 11, wherein the system, the second node, and the web source are communicatively connected to the network.

13. The system of claim 11, wherein the system is further configured to:

fetch the content item using at least a web real-time communication (webRTC) application programming interface (API).

14. The system of claim 11, wherein the signature is generated using a hash function computed over the content item or a portion of the content item.

15. The system of claim 11, wherein the system is further configured to:

protect the delivery of the content item over the network against malicious URL overriding activity.

16. The system of claim 15, wherein the system is further configured to:

determine if the second node maintains a validated copy of the content item, wherein the validated copy is originated from a trusted server;

fetch the content item from the second node, if the second node maintains a validated copy; and fetch the content item from a trusted server, if the second node does not maintain a validated copy.

17. The system of claim 11, wherein the selection of the second node is based on at least one of: current availability of the at least one additional node, locations the at least one additional node with respect to the system, and available bandwidth of the at least one additional node.

18. The system of claim 11, wherein the system is further configured to:

fetch a first portion from the second node; and preload the first portion to the memory, wherein the first portion is a predefined length of content from the beginning of the content item.

19. The system of claim 11, wherein the web source is at least any one of: a content delivery network (CDN) and a peer-to-peer Web Real-Time Communication (WebRTC) CDN.

* * * * *